W. H. DAVIS.
Harvester.
No. 232,632. Patented Sept. 28, 1880.
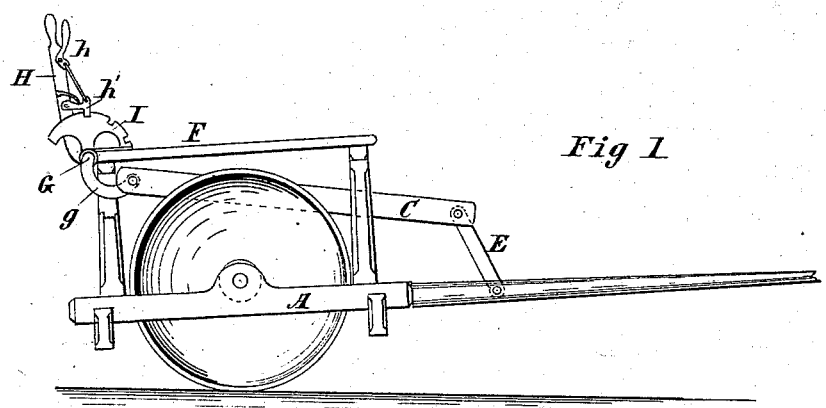
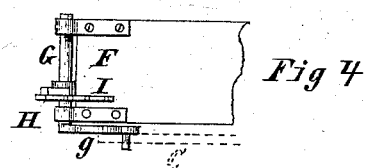
Fig 4
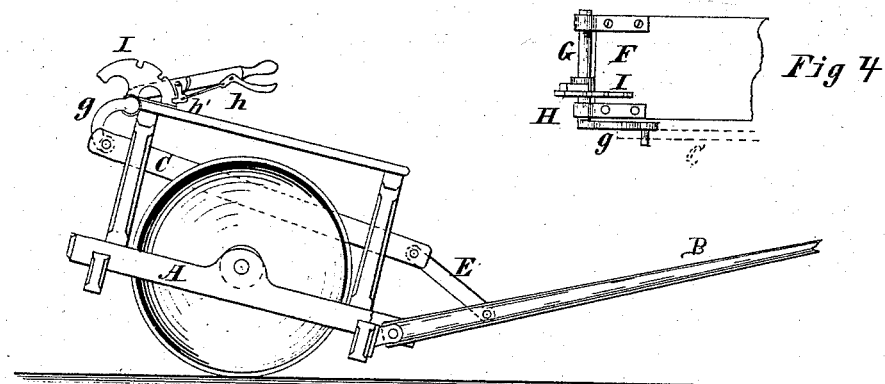
Fig 2
Fig 5
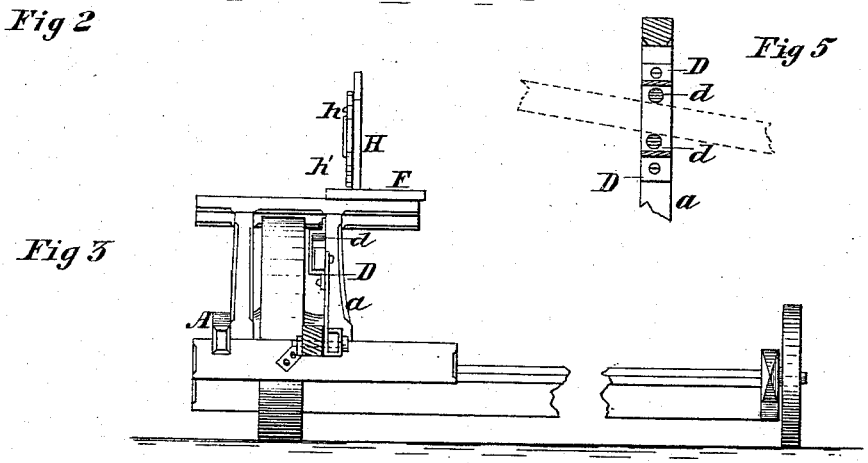
Fig 3
Witnesses
Inventor
William H. Davis
By Coburn & Shacher
Attorneys

UNITED STATES PATENT OFFICE.

WILLIAM H. DAVIS, OF MINNEAPOLIS, MINNESOTA.

HARVESTER.

SPECIFICATION forming part of Letters Patent No. 232,632, dated September 28, 1880.

Application filed August 29, 1879.

*To all whom it may concern:*

Be it known that I, WILLIAM H. DAVIS, of Minneapolis, in the county of Hennepin and State of Minnesota, have invented a new and useful Improvement in Harvesters, which is fully described in the following specification, reference being had to the accompanying drawings, in which—

Figure 1 represents a side elevation, from the stubble side of a harvesting-machine embodying my improvements, with the platform tilted up; Fig. 2, a similar view with the platform tilted down; Fig. 3, a front elevation of the same; Fig. 4, a detail plan view, showing the devices for operating the tilting-bar; and Fig. 5 a detail section, showing the support of the front end of said bar.

My invention relates to that class of machines in which the grain is delivered to a receiver and bound on the machine generally classed under the name "harvester," and especially to the tilting mechanism, by means of which the platform is tilted to raise and lower the cutting apparatus for the purpose of gathering lodged grain or changing the height of cut according to the length of grain.

The invention consists in the combination of a hinged pole with a horizontally-sliding bar linked thereto, a keeper within which the bar is retained, and mechanism for reciprocating the bar at will.

It also consists in special devices, all of which will be hereinafter fully described, and pointed out definitely in the claims.

In the drawings, A represents the main or supporting frame of a harvester of any ordinary construction; and B the pole, which is hinged at its rear end to the main frame in the usual manner.

A horizontal bar, C, is mounted at its front end in a loop or keeper, D, fastened to one of the upright standards $a$ of the upright portion of the supporting-frame. Within the keeper anti-friction rollers $d$ are arranged above and below the bar to facilitate the sliding back and forth of the latter in the keeper. This bar is connected at its front end to the pole by a pivoted link or rod, E, which is pivoted to the pole at a point a little forward of the hinge, by which the latter is attached to the main frame.

At the rear end of the seat-board F is mounted a rock-shaft, G, on the outer end of which is a crank-arm, $g$, pivoted at its outer end to the rear end of the bar C. A lever, H, is fastened to the rock-shaft, by means of which the latter is oscillated.

A notched segment, I, is attached to the seat-board, with which a spring-catch, $h'$, on the lever is arranged to engage, the lever being also provided with an ordinary tripping lever or latch, $h$, connected with the catch.

Now, it is evident that the reciprocation of the bar C will tilt the main frame and platform attached thereto by reason of the hinge-connection between the bar and the pole and between the latter and the main frame. This reciprocation is effected by vibrating the lever H, which oscillates the rock-shaft, and so vibrates the crank attached to the rear end of the bar. The platform may therefore be tilted at will by the attendant while he is riding on the machine, and secured at any adjustment by means of the notched segment and spring-catch on the lever.

The crank-arm provides a sufficient support for the rear end of the sliding bar, though, if desired, a second loop or keeper may be employed for this end of the bar also, in which case there should be sufficient play to the bar in the keeper to permit the raising and lowering of the rear end due to the movement of the crank, or the arm should be slotted to permit the crank-pin to move therein.

This mechanism is very light, simple, and cheap, and is easily operated by the attendant, so that it furnishes an efficient and desirable tilting device for harvesters of all kinds to which it can be applied.

It is evident that other means than those above mentioned may be employed to reciprocate the bar—for instance, a single straight lever, a cam-lever, or a rack-bar and pinion—and therefore I do not limit myself to the lever and cranked rock-shaft, as herein shown and described.

Having thus described my invention, what I claim, and desire to secure by Letters Patent, is—

1. In a harvesting-machine, the main or supporting frame, in combination with a pole hinged thereto, a reciprocating bar, a keeper in which the bar is held and slides back and forth, mounted thereon and connected at its forward end by a pivotal link to the pole in advance of its hinge, and mechanism whereby the bar may be reciprocated by the attendant on the machine, substantially as and for the purpose set forth.

2. The hinged pole B, in combination with the reciprocating bar C, keeper D, link E, rock-shaft G, provided with a crank-arm, $g$, and lever H, substantially as described.

WILLIAM H. DAVIS.

Witnesses:
ALEX. TYLER,
D. W. DAVIS.

Correction of Letters Patent No. 232,632.

It is hereby certified that in Letters Patent No. 232,632, granted September 28, 1880, to William H. Davis, for an improvement in Harvesters, an amendment consisting of the following words, to wit: " a keeper in which the bar is held and slides back and forth," was erroneously inserted after the word " bar" in line 3 of claim 1, when the said words should have been inserted after the word " hinge " in line 7 of said claim; that the proper corrections have been made in the files and records of the Patent Office, and are hereby made in said Letters Patent.

Signed, countersigned, and sealed this 27th day of January, A. D. 1881.

[SEAL.]

A. BELL,
*Acting Secretary of the Interior.*

Countersigned:
    E. M. MARBLE,
        *Commissioner of Patents.*